US006386491B1

(12) United States Patent
Bissett

(10) Patent No.: US 6,386,491 B1
(45) Date of Patent: May 14, 2002

(54) ICICLE LIGHTSTRING WINDING DEVICE

(76) Inventor: Kevin J. Bissett, 1773 Milldrum St., Union Grove, WI (US) 53182

( * ) Notice: Subject to any disclaimer, the term of this patent is extended or adjusted under 35 U.S.C. 154(b) by 0 days.

(21) Appl. No.: 09/603,383

(22) Filed: Jun. 26, 2000

(51) Int. Cl.[7] .................................................. A47F 5/04
(52) U.S. Cl. ................ 248/121; 248/125.1; 248/176.1; 248/188.7; 248/339; 211/205
(58) Field of Search .............................. 248/121, 125.7, 248/127, 188.7, 440.1, 518, 529, 163.1, 176.1, 317, 320, 322, 339, 340; 223/120; 211/33, 196, 205, 37; 403/169, 217, 400

(56) References Cited

U.S. PATENT DOCUMENTS

| | | | | |
|---|---|---|---|---|
| 1,747,951 A | * | 2/1930 | Reichert ...................... 211/30 |
| 3,335,870 A | * | 8/1967 | Hills ......................... 211/85.6 |
| 3,513,986 A | * | 5/1970 | Schier et al. ................... 211/1 |
| 3,638,814 A | * | 2/1972 | Lowery ....................... 211/189 |
| 3,734,301 A | * | 5/1973 | Rastocny ..................... 211/205 |
| 3,897,724 A | * | 8/1975 | McDonald .................... 100/34 |
| 3,955,787 A | * | 5/1976 | Brown ........................ 248/159 |
| 4,269,878 A | * | 5/1981 | Boström ...................... 428/11 |
| 4,712,758 A | * | 12/1987 | Cuschera .................. 248/188.7 |
| 4,767,088 A | * | 8/1988 | Fielder et al. ............... 248/121 |
| 4,911,391 A | * | 3/1990 | Ellis ........................ 248/188.7 |
| 4,919,368 A | * | 4/1990 | Garrett ..................... 248/121 |
| 5,566,837 A | * | 10/1996 | Lema .......................... 211/33 |
| 5,678,698 A | * | 10/1997 | Cabral ......................... 211/33 |
| 6,241,105 B1 | * | 6/2001 | Pomper ...................... 211/85.2 |

FOREIGN PATENT DOCUMENTS

IT 621345 B1 * 6/1961 ................. 248/121

* cited by examiner

*Primary Examiner*—Anita King
*Assistant Examiner*—Jon Szumny
(74) *Attorney, Agent, or Firm*—Jansson, Shupe & Munger, Ltd.

(57) ABSTRACT

A storage device for storing strings of ornamental lights which have a plurality of strands hanging pendant from the main string. The device has a plurality of spokes attached with respect to an elongate vertical member. It is preferable to have a storage-positioning member attached at either or both of the top or bottom ends of the elongate vertical member such that the device is stored upright. The invention also includes a method for attaching the string of lights to the device by rotating the string around the elongate vertical member as the strands hang down between the spokes.

15 Claims, 6 Drawing Sheets

ICICLE LIGHTSTRING WINDING DEVICE

FIELD OF THE INVENTION

This invention is related generally to storage of electrical ornamental lights and more particularly, storage of lights that have electrified strands hanging pendant from a main string.

BACKGROUND OF THE INVENTION

Icicle lights are a type of an electrified ornamental light commonly used for decorating homes and businesses during holiday seasons. Lights consist of a main strand of electrified lights designed to be installed horizontally on a building surface. Dangling down from the main string are a number of strands of electrified lights to loosely simulate natural icicles. The vertical strands are generally kinked to add to the effect.

Removal and storage of the lights at the end of decorating season such that the lights are easily replacable onto the building at the beginning of the ensuing holiday season has been difficult. Due to the strands, typical coiling is troublesome. Even when coiling is accomplished, storing of the coiled string in any spatial orientation causes the strands to entangle with themselves and the main coil.

It would be of significant benefit to have a device which would allow storage of icicle lights without tangling.

OBJECTS OF THE INVENTION

It is an object of this invention to provide an apparatus for storing ornamental lights which have strands pendant to the main string of lights, without tangling.

It is another object of this invention to provide a storage device for ornamental lights which can be stored on the floor or hanging from the ceiling.

A further object of this invention is to provide a light storage device which is easily assembled.

It is yet another object of this invention to provide a device that can easily engage lights by the rotation of the main portion of the device with respect to the storage-positioning member.

Another aspect of the invention is a method for placing lights onto a device for storing the lights without the strands being tangled.

How these and other objects are accomplished will be apparent from the descriptions which follow.

SUMMARY OF THE INVENTION

This invention is a novel storage device for storing strings of ornamental lights that have a plurality strands hanging pendant from the string. The device has an elongate vertical member extending generally along an axis and having a top end and a bottom end and a plurality of spokes attached with respect to the elongate vertical member and radiating therefrom such that each spoke is located at substantially the same predetermined distance from the bottom end of the elongate vertical member. It is preferable that the elongate vertical member is a cylinder.

The device has two preferred orientations of the angle of the spokes. In the first of these orientations, the spokes are angled upward with respect to the axis of the elongate vertical member. In this manner, as the strings are being spiraled onto the device, adjacent portions of the string may be easily placed close to each other. A preferred embodiment of this orientation includes a non-smooth surface to keep the adjacent portions of strings from tangling with each other as the string is placed on the device.

The other orientation of the spokes is perpendicular to the axis of the elongate vertical member. A preferred embodiment of this orientation has each of the spokes spaced equally around the elongate vertical member.

It is a preferred embodiment for the storage device to include a storage-positioning member attached with respect to an end of the elongate vertical member whereby the elongate vertical member may be stored in an upright position. The storage-positioning member may be a connecting member attached with respect to the top end of the elongate vertical member whereby the connecting member can removably engage a complementary connecting structure fastened to a fixed surface such that the elongate vertical member may hang vertically therefrom.

The preferred embodiment of the connecting member is a loop whereby a complementary hook attached to a fixed surface can removably engage the loop.

The storage-positioning member may also be a base support member attached with respect to the bottom end of the elongate vertical member. With a base support member, it is preferable to have the predetermined distance from the bottom end of the elongate vertical member to the spokes at least as long as the longest strand. The most preferable embodiment of the device is to have a connecting member at the top end of the elongate vertical member and the base support member at the bottom of the elongate vertical member such that a user has an option as to how to store the device vertically.

In one preferred embodiment of the device, there are four spokes. In a more preferred embodiment, the four spokes are made of an upper elongate horizontal member having a lower surface from which lower surface there is sufficient material removed to create a notch substantially transverse across the lower surface, and a lower elongate horizontal member having an upper surface from which upper surface there is sufficient material removed to create a notch substantially transverse across the upper surface. In this way, each elongate horizontal member can be inserted perpendicularly with respect to each other through the elongate vertical member such that the notch of the lower surface of the upper elongate horizontal member will engage the notch on the upper surface of the lower elongate horizontal member within the elongate vertical member.

In yet another embodiment of the device, the elongate vertical member may rotatably move with respect to either or both of the storage-positioning members about the axis of the elongate vertical member.

Another aspect of the invention is method for storing strings of ornamental lights which have two ends and a plurality of strands interspersed between the two ends, said strands hanging pendant from the string, using a device having a elongate vertical member extending generally along an axis including a top end and a bottom end, with spokes attached with respect to the elongate vertical member and radiating from it. The method involves the the steps of: indenting an end portion of a string of oramental lights; placing the end portion of the string of ornamental lights adjacent to the elongate vertical member directly above a point of attachment of the spokes to the elongate vertical member; rotating the elongate vertical member about the axis such that the entire string of ornamental lights removably coils around the elongate vertical member with the strands hanging down substantially parallel to the axis of the elongate vertical member and between the spokes; and placing the device vertically in a location suitable for storage of the ornamental lights.

Another embodiment of this method involves the elongate vertical member having a connecting member attached with respect to the top end of the elongate vertical member. In this way the connecting member can removably engage a complementary connecting structure fastened to a fixed surface such that the elongate vertical member may hang vertically.

DETAILED DESCRIPTION OF PREFERRED EMBODIMENTS

Figure 1:
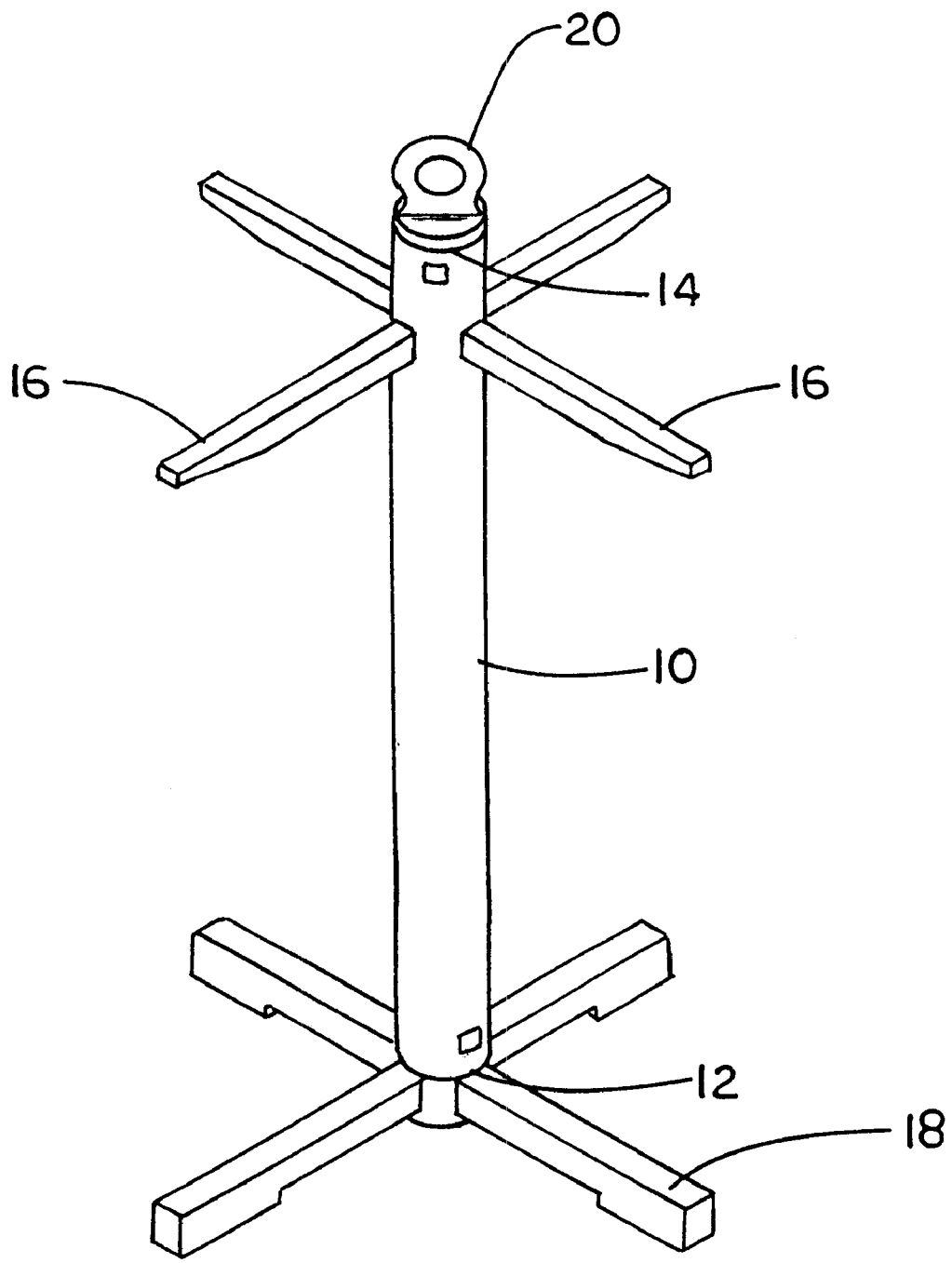
FIG. 1 is perspective view of a preferred embodiment of the device with four spokes and a storage positioning member found on the top and bottom ends of the device.

FIG. 1 shows a perspective view of a preferred embodiment of the device with four spokes 16. The elongate vertical member 10 may be any suitable shape, shown here as a cylinder. The cylinder may be of any diameter; with one preferred embodiment the diameter is two inches to facilitate rotating the elongate vertical member 10 around its axis 34 (in FIG. 4). The elongate vertical member 10 may be any material. Commercially preferred embodiments are of cardboard composites or hard plastics such as polyvinylchloride.

Figure 2:
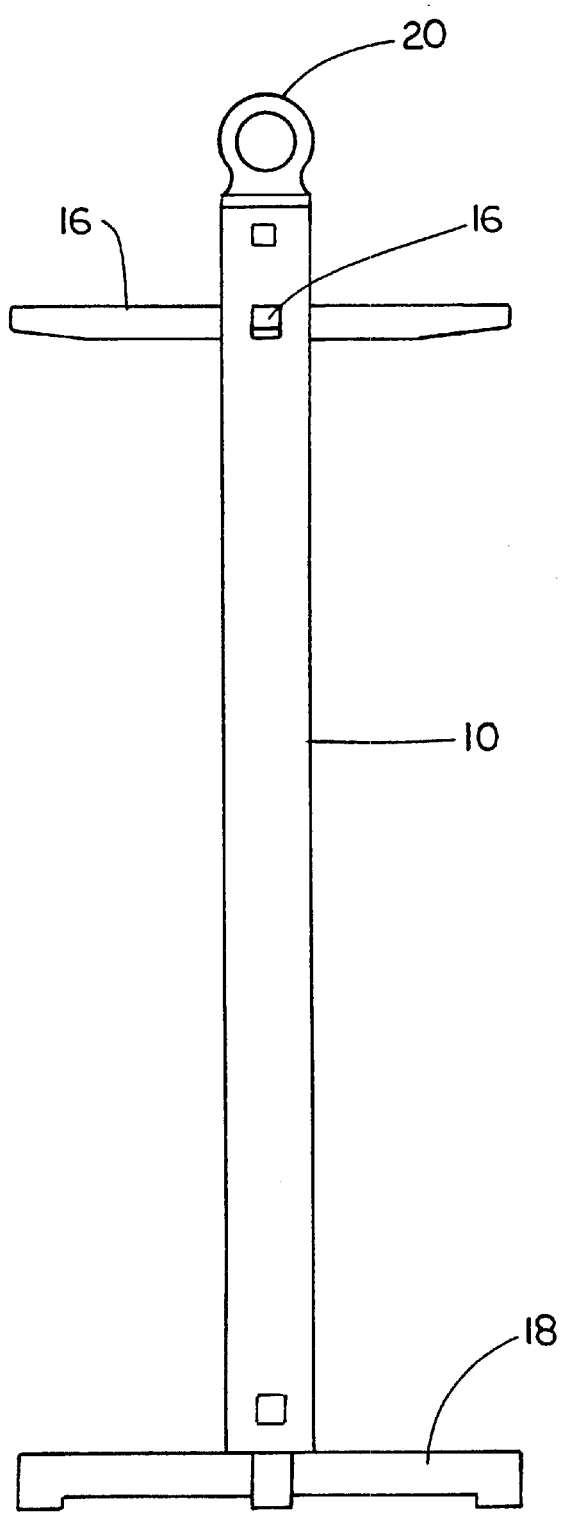
FIG. 2 is a side view of the same device depicted in FIG. 1.
Figure 3:
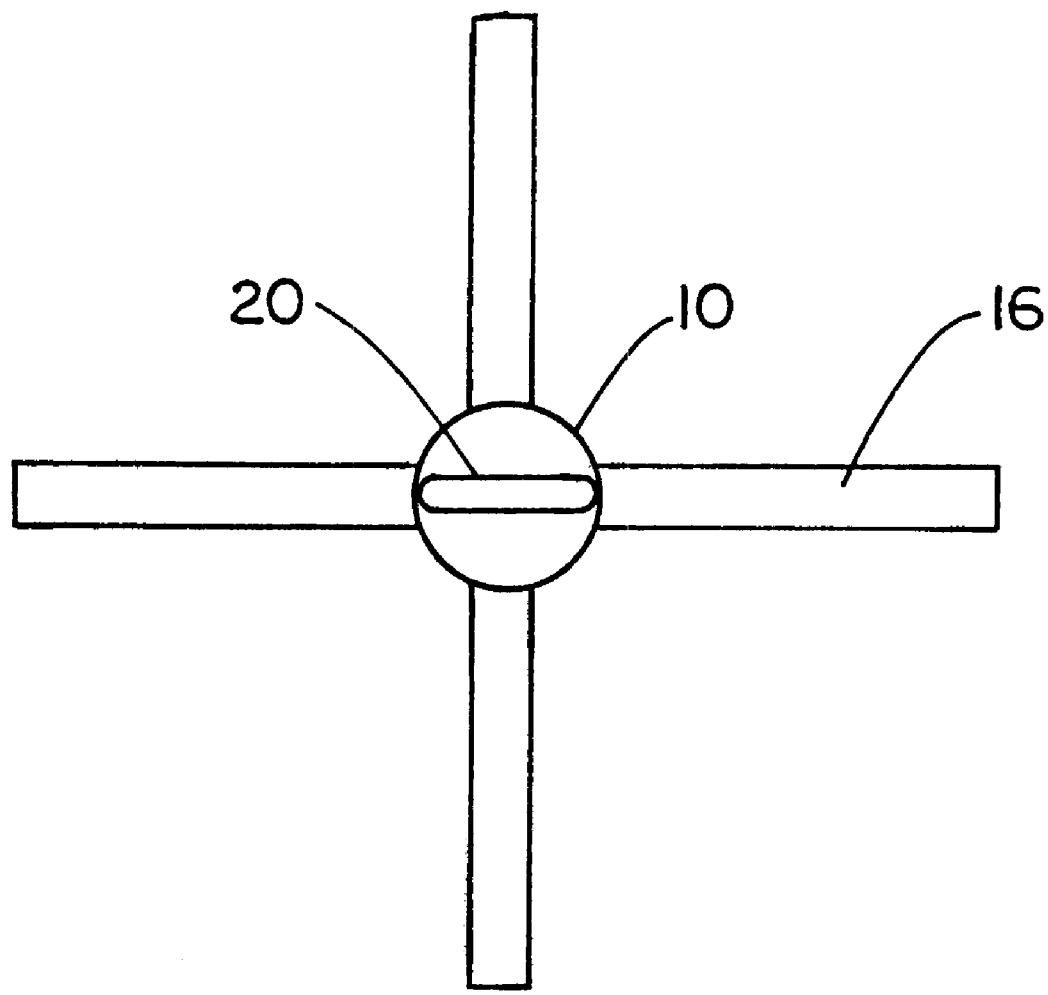
FIG. 3 is a top view of the same device depicted in FIG. 1.
Figure 4:
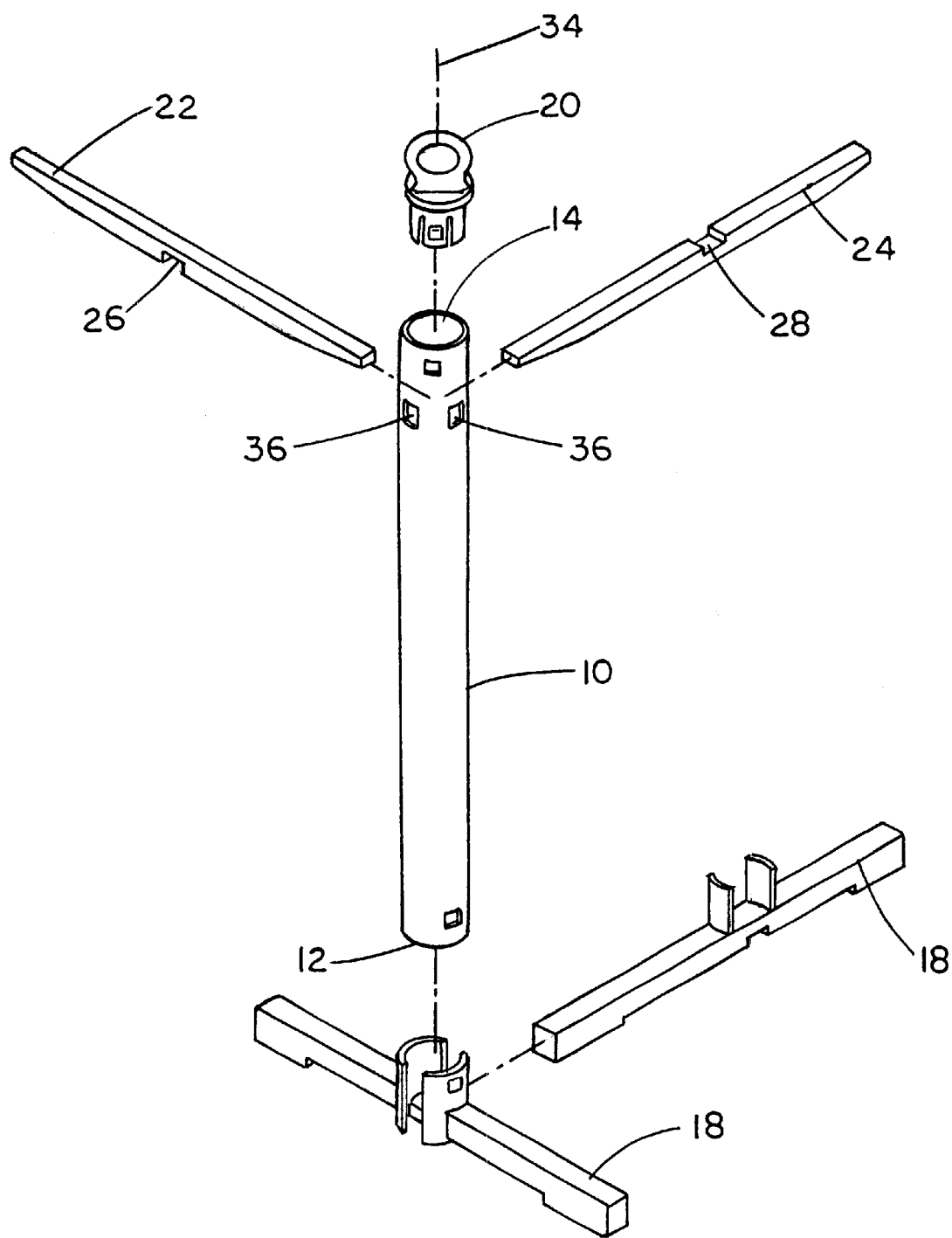
FIG. 4 is an exploded perspective view of preferred embodiment with four spokes created by two elongate horizontal members.

FIGS. 1–6 show a preferred embodiment with an upper connecting member 20 and a base support member 18. The connecting member 20 may be any suitable means for hanging the device in an upright manner when the string of lights 30 is being stored. The preferred embodiment of the connecting member 20 shown is a loop made of hard plastic or metal to engage a complementary fixed connector such as a hook or nail attached to a ceiling or ceiling joist. The base member 18 is designed to stand the device upright when placed on a flat horizontal surface such as a floor. The base support member 18 may be any suitable means for holding the device upright. FIG. 4 shows one preferred embodiment with the base support member 18 being two flat complementary pieces linked together. A virtue of this design is that it allows for a more compact packaging of the device than many other types of base support members 18.

The preferred embodiment of the device requires a storage-positioning member either in the form of a base support member 18 or a connecting member 20. The most preferred embodiment has both the base support member 18 and the connecting member 20 to allow the end user either option for storage.

FIG. 2 shows the spokes 16 perpendicular with the axis 34 (in FIG. 4) of the elongate vertical member 10. This is one embodiment. Another embodiment, not shown, is with the spokes 16 angled upward with respect to the axis 34 (in FIG. 4) of the elongate vertical member 10.

FIG. 3 shows a top view of the preferred embodiment of the device. The spokes 16 are equally placed around the vertical support member 10 which in this depiction is a cylinder. In this embodiment, spokes 16 are perpendicular with respect to each other. There are four spokes 16 depicted in this embodiment. Any number of spokes greater than one may be used.

FIG. 4 shows an embodiment of this device containing four spokes 16. The spokes are shown in an exploded manner as being composed of two elongate horizontal members: an upper elongate horizontal member 22 and a lower elongate horizontal member 24. The upper elongate horizontal member has a lower notch 26. The lower elongate horizontal member 24 has an upper notch 28. The upper elongate horizontal member is inserted into a receiving hole 36 in the vertical elongate member 10; likewise the lower elongate horizontal member 24 is inserted into a receiving hole 36 on the elongate vertical member 10 such that the two elongate horizontal members are inserted perpendicular with respect to each other and on the same plane. In this manner, the lower notch 28 can engage the upper notch 26 while within the body of the elongate vertical member 10. FIG. 4 also depicts a connecting member 20 being easily installed at the top 14 of the elongate vertical member 10. Similarly, the base support member 18 is inserted into the bottom 12 of the elongate vertical member 10 to create the preferred embodiment.

Figure 5:
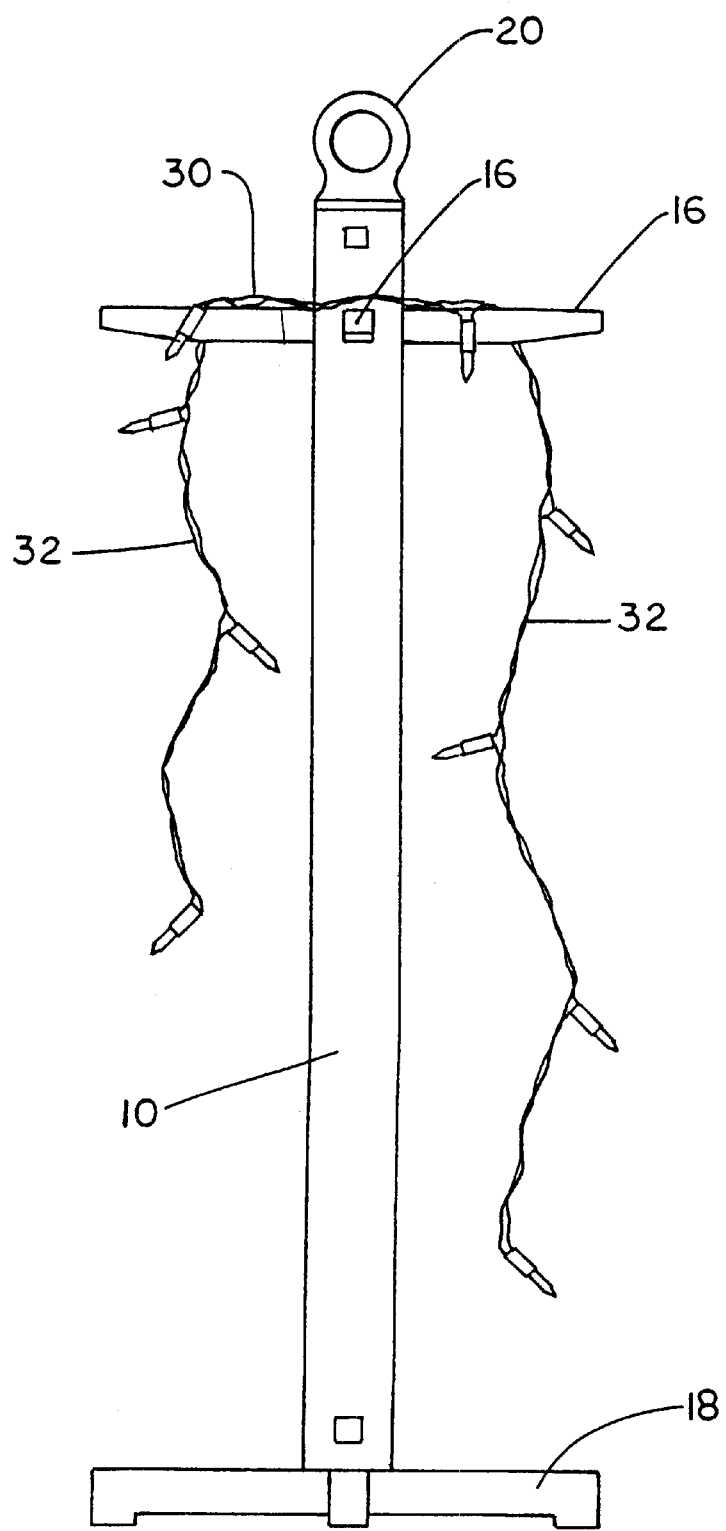
FIG. 5 is a side view of the device of FIG. 1 with a string of ornamental lights engaged.

FIG. 5 shows the preferred embodiment with a portion of the string of lights 30 shown for representative purposes. The string of lights 30 hang along the top of the spokes 16 while the strands 32 hang down therefrom. The strands 32 are shorter in length than the distance between the spokes 16 and the base support member 18 when the device comes with a base support member 18.

Figure 6:
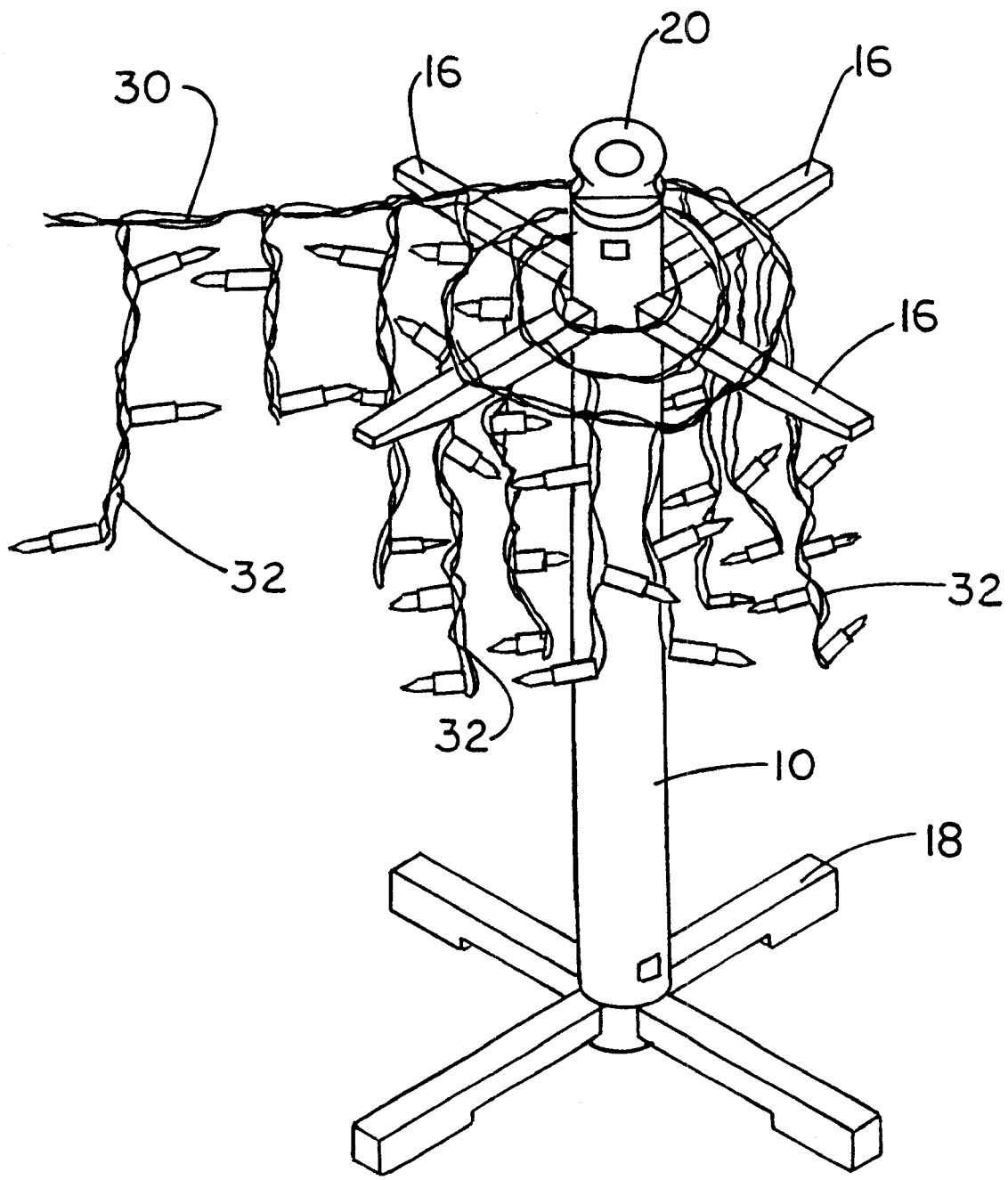
FIG. 6 is a perspective view of the device of FIG. 1 with a string of ornamental lights partially mounted on the device.

FIG. 6 shows a perspective view of the string having been spiraled several times around the elongate vertical support member 10. The string of lights 30 has several strands 32 hanging down therefrom. As the major string of lights is coiled around the elongate vertical member 10 the strands 32 hang down in a manner such that they do not engage each other nor do they engage the main string of lights 30.

FIGS. 5 and 6 demonstrate a method for storing strings of ornamental lights. An end of the string of lights 30 is placed above the spokes along the elongate vertical member while the elongate vertical member 10 is rotated such that the string of lights 30 spirals around the vertical support member 10 with the strands of lights 32 hanging down from the spokes 16.

FIG. 4 also depicts a device where the elongate vertical member 10 may rotate around its axis 34 with respect to a connecting member 20 such that the connecting member 20 may be fixed in one place while the elongate vertical member 10 may be rotated as the strings of light 30 are placed onto the device. Connecting member 20 may be rotatably joined to elongate vertical member by any of various known means, such as a rotational snap-fit arrangement.

While the principles of this invention have been described in connection with specific embodiments, it should be understood clearly that these descriptions are made only by way of example and are not intended to limit the scope of the invention.

What is claimed is:

1. In combination with a string of ornamental lights which has two ends and a plurality of strands interspersed between the two ends, said strands hanging pendant from the string, a storage device comprising:

an elongate vertical member extending generally along an axis and having a top end and a bottom end;

a plurality of spokes attached with respect to the elongate vertical member near the top end of the vertical member and radiating therefrom such that each spoke is located at substantially the same predetermined distance from the bottom end of the elongate vertical member, the spokes being above a substantially unimpeded strand-hanging region around and along the length of the elongate vertical member, the string of lights being coiled around the vertical member above and supported by the spokes at positions thereon near and progressively farther form the vertical member, with the strands banging freely between the spokes.

2. The combination of claim 1 wherein the device includes a storage-positioning positioning member attached with respect to an end of the elongate vertical member whereby the elongate vertical member may be stored in an upright position.

3. The combination of claim 2 wherein the elongate vertical member is a cylinder.

4. The combination of claim 3 wherein the spokes form an angle with the axis of the elongate vertical member of less than 90°, inclined toward the top end.

5. The combination of claim 4 wherein the spokes have a non-smooth surface of sufficient roughness to resist string slippage thereon.

6. The combination of claim 3 wherein the spokes form an angle with the axis of the elongate vertical member of about 90°.

7. The combination of claim 6 wherein each spoke is equidistant from adjacent spokes.

8. The combination of claim 7 wherein the elongate vertical member may rotatably move with respect to the storage-positioning member about the axis of the elongate vertical member.

9. The combination of claim 2 wherein the storage-positioning member is a connecting member attached with respect to the top end of the elongate vertical member whereby the connecting member can removably engage a complementary connecting structure fastened to a fixed surface such that the elongate vertical member may hang vertically therefrom.

10. The combination of claim 9 herein the connecting member is a loop whereby a complementary hook attached to a fixed surface can removably engage the loop.

11. The combination of claim 2 wherein the storage-positioning member is a base support member attached with respect to the bottom end of the elongate vertical member.

12. The combination of claim 11 wherein the predetermined distance from the bottom end of the elongate vertical member is adapted to be at least as long as the longest strand.

13. The combination of claim 12 wherein there is a second storage-positioning member which includes a connecting member attached with respect to the top end of the elongate vertical member whereby the connecting member can removably engage a complementary connecting structure fastened to a fixed surface such that the elongate vertical member may hang vertically therefrom.

14. The combination of claim 13 wherein there are four spokes.

15. The combination of claim 14 wherein the four spokes include:

an upper elongate horizontal member having a lower surface from which lower surface there is sufficient material removed to create a notch substantially transverse across the lower surface;

a lower elongate horizontal member having an upper surface from which upper surface there is sufficient material removed to create a notch substantially transverse across the upper surface;

whereby each elongate horizontal member can be inserted perpendicularly with respect to each other through the elongate vertical member such that the notch of the lower surface of the upper elongate horizontal member will engage the notch on the upper surface of the lower elongate horizontal member within the elongate vertical member.

* * * * *